US012609133B2

(12) United States Patent
Yasuda et al.

(10) Patent No.: US 12,609,133 B2
(45) Date of Patent: Apr. 21, 2026

(54) SCENE SELECTION METHOD, SCENE SELECTION APPARATUS AND PROGRAM

(71) Applicant: NTT, Inc., Tokyo (JP)

(72) Inventors: Masahiro Yasuda, Tokyo (JP); Yasunori Ohishi, Tokyo (JP); Shoichiro Saito, Tokyo (JP)

(73) Assignee: NTT, Inc., Tokyo (JP)

( * ) Notice: Subject to any disclaimer, the term of this patent is extended or adjusted under 35 U.S.C. 154(b) by 213 days.

(21) Appl. No.: 18/274,775

(22) PCT Filed: Feb. 10, 2021

(86) PCT No.: PCT/JP2021/004910
§ 371 (c)(1),
(2) Date: Jul. 28, 2023

(87) PCT Pub. No.: WO2022/172348
PCT Pub. Date: Aug. 18, 2022

(65) Prior Publication Data
US 2024/0087594 A1 Mar. 14, 2024

(51) Int. Cl.
*G10L 25/51* (2013.01)
*G10L 19/00* (2013.01)

(52) U.S. Cl.
CPC .............. *G10L 25/51* (2013.01); *G10L 19/00* (2013.01)

(58) Field of Classification Search
CPC ........................................................ G10L 25/51
See application file for complete search history.

(56) References Cited

U.S. PATENT DOCUMENTS 10,853,661 B2 * 12/2020 Xu ........................ G06F 40/237
2004/0165730 A1 * 8/2004 Crockett ................. G10L 15/04 704/E15.005
2012/0143363 A1 * 6/2012 Liu ......................... G10L 15/02 700/94
2014/0279764 A1 * 9/2014 Lahr ......................... G06F 9/54 706/47
2016/0225377 A1 * 8/2016 Miyasaka ............. G10L 19/008
2016/0364963 A1 * 12/2016 Matsuoka ............ G06V 10/764
2017/0154638 A1 * 6/2017 Hwang ................... G01S 3/808
(Continued)

OTHER PUBLICATIONS

Imoto et al. (2017) "Spatial Cepstrum as a Spatial Feature Using a Distributed Microphone Array for Acoustic Scene Analysis," IEEE/ACM Transactions on Audio, Speech, and Language Processing, vol. 25, No. 6, Jun. 2017.
(Continued)

*Primary Examiner* — Shaun Roberts

(57) ABSTRACT

Provided is a technique for accurately estimating a scene even when the number of input signals increases. A scene estimation method includes: when S is the number of scenes and M is the number of input acoustic signals, an acoustic signal encoding step of generating, by a scene estimation device, an integrated acoustic feature amount from an m-th input acoustic signal (m=1, . . . , M) and a position where the m-th input acoustic signal is acquired (hereinafter referred to as an m-th input acoustic signal acquisition position) (m=1, . . . , M); and a scene selection step of selecting, by the scene estimation device, a scene from which M input acoustic signals are acquired from among S scenes, using the integrated acoustic feature amount.

5 Claims, 7 Drawing Sheets

(56) References Cited

U.S. PATENT DOCUMENTS

| | | | | |
|---|---|---|---|---|
| 2018/0365950 | A1* | 12/2018 | Nongpiur | G08B 25/008 |
| 2020/0169824 | A1* | 5/2020 | Mcgrath | H04S 3/008 |
| 2021/0182387 | A1* | 6/2021 | Zhu | G06N 7/01 |
| 2022/0067090 | A1* | 3/2022 | Jain | G06F 16/686 |

OTHER PUBLICATIONS

Zhukov et al. (2019) "Cross-Task Weakly Supervised Learning from Instructional Videos," IEEE/CVF Conference on Computer Vision and Pattern Recognition (CVPR) 2019, Jun. 2019.

* cited by examiner

SCENE SELECTION METHOD, SCENE SELECTION APPARATUS AND PROGRAM

CROSS-REFERENCE TO RELATED APPLICATIONS

This application is a U.S. National Stage Application filed under 35 U.S.C. § 371 claiming priority to International Patent Application No. PCT/JP2021/004910, filed on 10 Feb. 2021, the disclosure of which is hereby incorporated herein by reference in its entirety.

TECHNICAL FIELD

The present invention relates to a technique for estimating a scene from which an acoustic signal or a video signal is acquired.

BACKGROUND ART

Conventionally, there is a technique for estimating a scene from which an acoustic signal or a video signal is acquired by using the acoustic signal or the video signal, as in NPL 1 and NPL 2.

CITATION LIST

Non Patent Literature

[NPL 1] K. Imoto et al., "Spatial Cepstrum as a Spatial Feature Using a Distributed Microphone Array for Acoustic Scene Analysis," IEEE/ACM Transactions on Audio, Speech, and Language Processing, Vol. 25, No. 6, JUNE 2017.

[NPL 2] D. Zhukov et al., "Cross-Task Weakly Supervised Learning from Instructional Videos," IEEE/CVF Conference on Computer Vision and Pattern Recognition (CVPR) 2019, JUNE 2019.

SUMMARY OF INVENTION

Technical Problem

In general, as the number of acoustic signals and video signals used for scene estimation increases, the amount of information that can be used for scene estimation increases due to the reduction of blind spots and the like, and the accuracy of scene estimation increases, but data handled in scene estimation processing has higher dimensionality. As a result, a so-called curse of dimensionality occurs, and there arises a problem that even if the number of acoustic signals and video signals is increased, the accuracy is not as high as expected.

Hence, an object of the present invention is to provide a technique for accurately estimating a scene even if the number of input signals increases.

Solution to Problem

One aspect of the present invention includes: when S is the number of scenes and M is the number of input acoustic signals, an acoustic signal encoding step of generating, by a scene estimation device, an integrated acoustic feature amount from an m-th input acoustic signal (m=1, . . . , M) and a position where the m-th input acoustic signal is acquired (hereinafter referred to as an m-th input acoustic signal acquisition position) (m=1, . . . , M); and a scene selection step of selecting, by the scene estimation device, a scene from which M input acoustic signals are acquired from among S scenes, using the integrated acoustic feature amount.

One aspect of the present invention includes: when S is the number of scenes, M is the number of input acoustic signals, and N is the number of input video signals, an acoustic signal encoding step of generating, by a scene estimation device, an integrated acoustic feature amount from an m-th input acoustic signal (m=1, . . . , M) and a position where the m-th input acoustic signal is acquired (hereinafter referred to as an m-th input acoustic signal acquisition position) (m=1, . . . , M); a video signal encoding step of generating, by the scene estimation device, an integrated video feature amount from an n-th input video signal (n=1, . . . , N) and a position where the n-th input video signal is acquired (hereinafter referred to as an n-th input video signal acquisition position) (n=1, . . . , N); and a scene selection step of selecting, by the scene estimation device, a scene from which M input acoustic signals and N input video signals are acquired from among S scenes, using the integrated acoustic feature amount and the integrated video feature amount.

Advantageous Effects of Invention

According to the present invention, it is possible to accurately estimate a scene even if the number of input signals increases.

DESCRIPTION OF EMBODIMENTS

Figure 1:
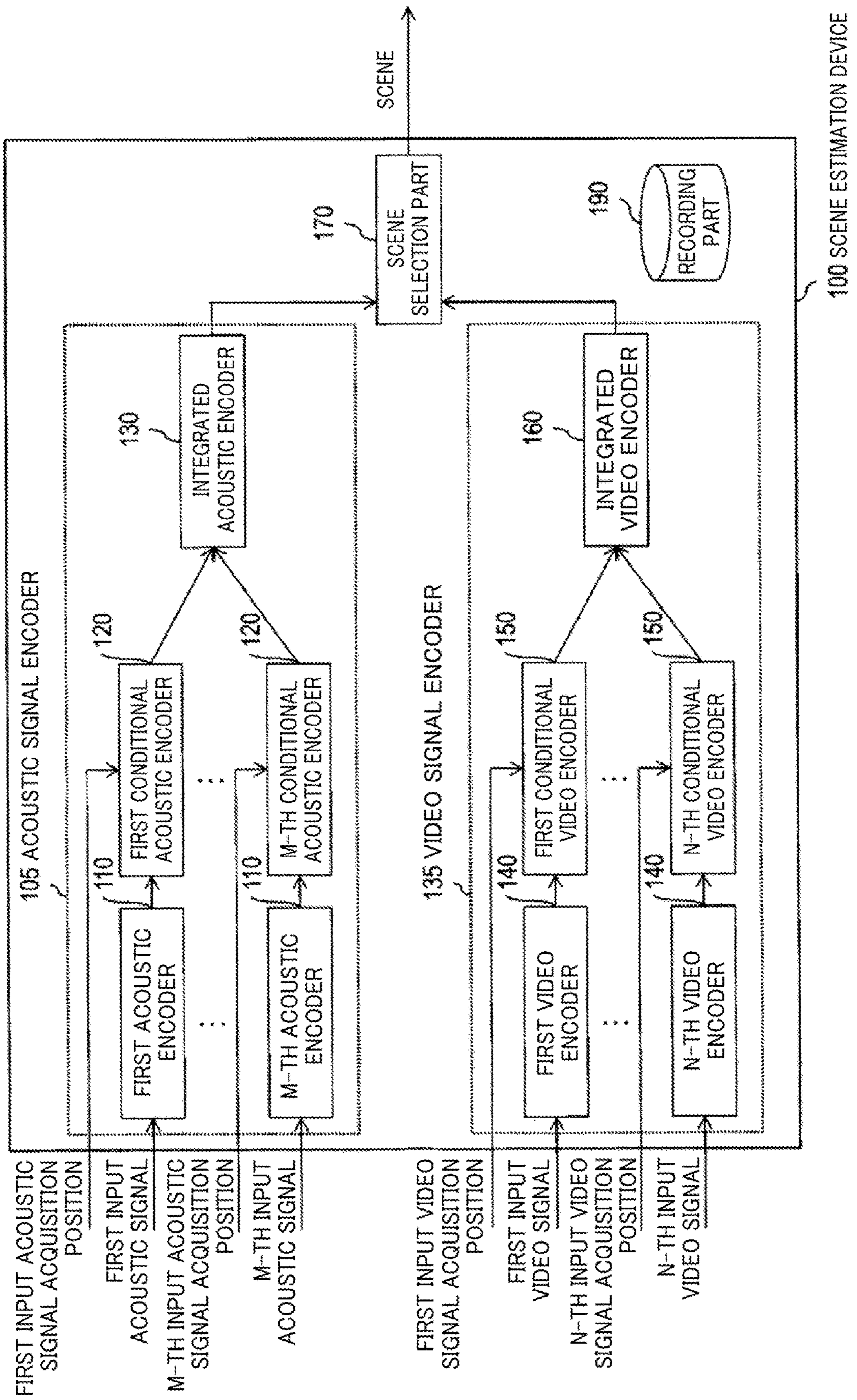
FIG. 1 is a block diagram illustrating an example of a configuration of a scene estimation device 100.

Hereinafter, embodiments of the present invention will be described in detail. Note that components having the same function are denoted by the same number, and redundant description will be omitted.

A notation method used in this specification will be described before the embodiments are described.

A "^" (caret) indicates a superscript. For example, $x^{y\hat{}z}$ indicates that $y^z$ is a superscript to x, and indicates that $x_{y\hat{}z}$ is a subscript to x. In addition, _ (underscore) indicates a subscript. For example, $x^{y\_z}$ indicates that $y_z$ is a superscript to x, and $x_{y\_z}$ indicates that $x_z$ is a subscript to x.

Superscripts "^" and "~" as in ^x and ~x for a certain character x would normally be written directly above "x," but are written as ^x or ~x here due to restrictions on notation in this specification.

First, the points of the present invention will be described. As described above, as the number of dimensions of the data to be handled increases, the curse of dimensionality comes to affect the data. Therefore, removing features which are not necessary for scene estimation from the features extracted from the acoustic signal and the video signal is considered.

It is difficult to extract only the minimum necessary feature amount for all the acoustic signals and all the video signals even in the case of an encoder which is a feature amount extracting means learned in accordance with a space serving as a scene estimation object. This is because the information that can be acquired differs depending on a position where a microphone or a camera used for acquiring the acoustic signal or the video signal is installed, and therefore, for example, even if the microphone is installed at a certain position, a feature that is added to the feature included in the information acquired only by a microphone installed at another position is acquired. By removing such redundant information, the dimensionality of the feature amount is reduced. In the embodiment of the present invention, as a method of removing redundant information caused by the difference in the installation position described above, a method of employing an encoder for removing redundant information at a subsequent stage of an encoder in which a position where a microphone or a camera is installed is not considered will be described.

First Embodiment

A scene estimation device 100 receives M (where M is an integer of 1 or more) sets of an input acoustic signal and a position where the input acoustic signal is acquired, and N (where N is an integer of 1 or more) sets of an input video signal and a position where the input video signal is acquired as inputs, and selects and outputs a scene from which the input acoustic signals and the input video signals are acquired from among S (where S is an integer of 1 or more) scenes. Here, a scene is a scene in which a series of single events occur continuously. For example, a scene of "someone enters an office" can be understood as a scene in which four events of "opening the door of the office," "greeting," "walking to his/her desk," and "taking a seat" are consecutive.

A microphone can be used for acquiring the input acoustic signal. In addition, a camera can be used for acquiring the input video signal.

It is assumed that the input acoustic signal and the input video signal are synchronized with each other. The lengths of the input acoustic signal and the input video signal are the same, and this length is referred to as a clip length.

Figure 2:
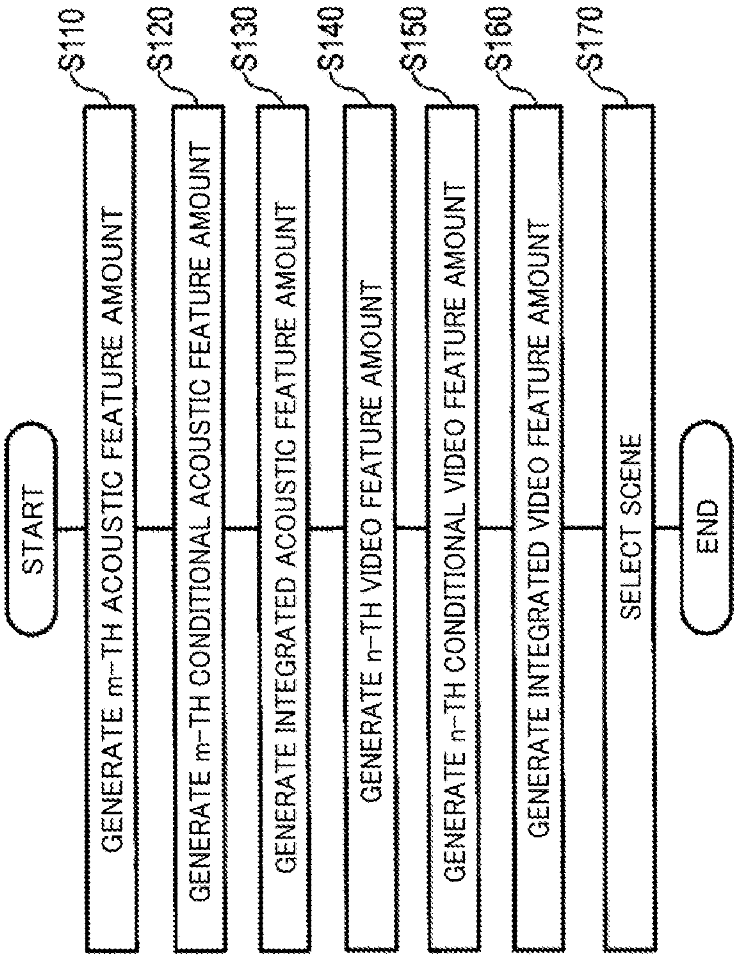
FIG. 2 is a flowchart illustrating an example of an operation of the scene estimation device 100.

The scene estimation device 100 will be described below with reference to FIGS. 1 and 2. FIG. 1 is a block diagram illustrating the configuration of the scene estimation device 100. FIG. 2 is a flowchart illustrating the operation of the scene estimation device 100. As illustrated in FIG. 1, the scene estimation device 100 includes M acoustic encoders 110 (hereinafter referred to as a first acoustic encoder 110, . . . , an M-th acoustic encoder 110), M conditional acoustic encoders 120 (hereinafter referred to as a first conditional acoustic encoder 120, . . . , an M-th conditional acoustic encoder 120), an integrated acoustic encoder 130, N video encoders 140 (hereinafter referred to as a first video encoder 140, . . . , an N-th video encoder 140), N conditional video encoders 150 (hereinafter referred to as a first conditional video encoder 150, . . . , an N-th conditional video encoder 150), an integrated video encoder 160, a scene selection part 170, and a recording part 190. The recording part 190 is a component that appropriately records information necessary for processing of the scene estimation device 100.

A component including the first acoustic encoder 110, . . . , the M-th acoustic encoder 110, the first conditional acoustic encoder 120, . . . , the M-th conditional acoustic encoder 120, and the integrated acoustic encoder 130 is called an acoustic signal encoder 105. In addition, a component including the first video encoder 140, . . . , the N-th video encoder 140, the first conditional video encoder 150, . . . , the N-th conditional video encoder 150, the integrated video encoder 160 is called a video signal encoder 135.

An operation of the scene estimation device 100 will be described with reference to FIG. 2. Hereinafter, various feature amounts generated in the process of the operation of the scene estimation device 100 are vectors of predetermined dimensions determined for each feature amount.

In S110, the m-th acoustic encoder 110 receives an m-th input acoustic signal as an input, and generates and outputs an m-th acoustic feature amount from the m-th input acoustic signal. Here, the dimension of the m-th acoustic feature amount is smaller than the dimension of the m-th input acoustic signal. For the configuration of the m-th acoustic encoder 110, for example, multi-layer convolutional neural networks (CNN) can be used as neural networks. In this case, the m-th acoustic encoder 110 converts the m-th input acoustic signal into a logarithmic absolute value of a short-time Fourier transform (STFT) spectrogram, and inputs a logarithmic mel spectrogram obtained by applying a mel filter bank to the multi-layer CNN.

In S120, the m-th conditional acoustic encoder 120 receives the m-th acoustic feature amount generated in S110 and a position where the m-th input acoustic signal is acquired (hereinafter referred to as an m-th input acoustic signal acquisition position) as inputs, and generates and outputs an m-th conditional acoustic feature amount from the m-th acoustic feature amount and the m-th input acoustic signal acquisition position. Here, the dimension of the m-th conditional acoustic feature amount is smaller than the dimension of the m-th acoustic feature amount. For the configuration of the m-th conditional acoustic encoder 120, for example, a neural network composed of one linear layer can be used. In this case, the m-th conditional acoustic encoder 120 inputs a vector obtained by combining the m-th acoustic feature amount and the m-th input acoustic signal acquisition position to the neural network.

In S130, the integrated acoustic encoder 130 receives the m-th conditional acoustic feature amount (m=1, . . . , M) generated in S120 as an input, and generates and outputs an integrated acoustic feature amount from the m-th conditional acoustic feature amount (m=1, . . . , M). For the configuration of the integrated acoustic encoder 130, for example, a neural network composed of one linear layer can be used. In this case, the integrated acoustic encoder 130 inputs a vector obtained by combining the m-th conditional acoustic feature amount (m=1, . . . , M) to the neural network.

In S140, the n-th video encoder 140 receives the n-th input video signal as an input, and generates and outputs an n-th video feature amount from the n-th input video signal. Here, the dimension of the n-th video feature amount is smaller than the dimension of the n-th input video signal. For the configuration of the n-th video encoder 140, for example, ResNet can be used as a neural network (see Reference NPL 1).

(Reference NPL 1: D. Tran et al., "A Closer Look at Spatiotemporal Convolutions for Action Recognition," IEEE/CVF Conference on Computer Vision and Pattern Recognition(CVPR) 2018, JUNE 2018.) The reason why it is preferable to use ResNet for the configuration of the n-th video encoder 140 will be described. It is preferable that the n-th video encoder 140 can extract a feature as a moving image taking into consideration a relationship between frames in addition to a feature as an image of each frame of the video. The configuration satisfying this condition is ResNet, and for example, ResNet(2+1)D which is a neural network achieving high accuracy in human behavior recognition can be mentioned.

In S150, the n-th conditional video encoder 150 receives the n-th video feature amount generated in S140 and a position where the n-th input video signal is acquired (hereinafter referred to as an n-th input video signal acquisition position) as inputs, and generates and outputs an n-th conditional video feature amount from the n-th video feature amount and the n-th input video signal acquisition position. Here, the dimension of the n-th conditional video feature amount is smaller than the dimension of the n-th video feature amount. For the configuration of the n-th conditional video encoder 150, for example, a neural network composed of one linear layer can be used. In this case, the n-th conditional video encoder 150 inputs a vector obtained by combining the n-th video feature amount and the n-th input video signal acquisition position to the neural network.

In S160, the integrated video encoder 160 receives the n-th conditional video feature amount (n=1, . . . , N) generated in S150 as an input, and generates and outputs an integrated video feature amount from the n-th conditional video feature amount (n=1, . . . , N). For the configuration of the integrated video encoder 160, for example, a neural network composed of one linear layer can be used. In this case, the integrated video encoder 160 inputs a vector obtained by combining the n-th conditional video feature amount (n=1, . . . , N) to the neural network.

In S170, the scene selection part 170 receives the integrated acoustic feature amount generated in S130 and the integrated video feature amount generated in S160 as inputs, and selects and outputs a scene from which M input acoustic signals and N input video signals are acquired from among S scenes using the integrated acoustic feature amount and the integrated video feature amount. For the configuration of the scene selection part 170, for example, a neural network composed of one linear layer and one Softmax layer can be used. In this case, the scene selection part 170 inputs a vector obtained by combining the integrated acoustic feature amount and the integrated video feature amount to the neural network.

The operations of the acoustic signal encoder 105 and the video signal encoder 135 can be described as follows. The acoustic signal encoder 105 receives the m-th input acoustic signal (m=1, . . . , M) and the m-th input acoustic signal acquisition position (m=1, . . . , M) as inputs, and generates and outputs an integrated acoustic feature amount from the m-th input acoustic signal (m=1, . . . , M) and the m-th input acoustic signal acquisition position (m=1, . . . , M). The video signal encoder 135 receives the n-th input video signal (n=1, . . . , N) and the n-th input video signal acquisition position (n=1, . . . , N) as inputs, and generates and outputs an integrated video feature amount from the n-th input video signal (n=1, . . . , N) and the n-th input video signal acquisition position (n=1, . . . , N).

According to the embodiment of the present invention, it is possible to accurately estimate a scene even if the number of input signals increases. Specifically, by using the information on the position where the signal is acquired, a conditional feature amount having a smaller dimension can be generated, especially regarding the attention to be paid in the signal acquisition position, and by using the conditional feature amount, a scene can be accurately estimated.

Second Embodiment

In the first embodiment, both the acoustic signal and the video signal are used as inputs, but only the acoustic signal may be used. That is, a scene estimation device 200 receives M (where M is an integer of 1 or more) sets of an input acoustic signal and a position where the input acoustic signal is acquired as inputs, and selects and outputs a scene from which the input acoustic signals are acquired from among S (where S is an integer of 1 or more) scenes.

Figure 3:
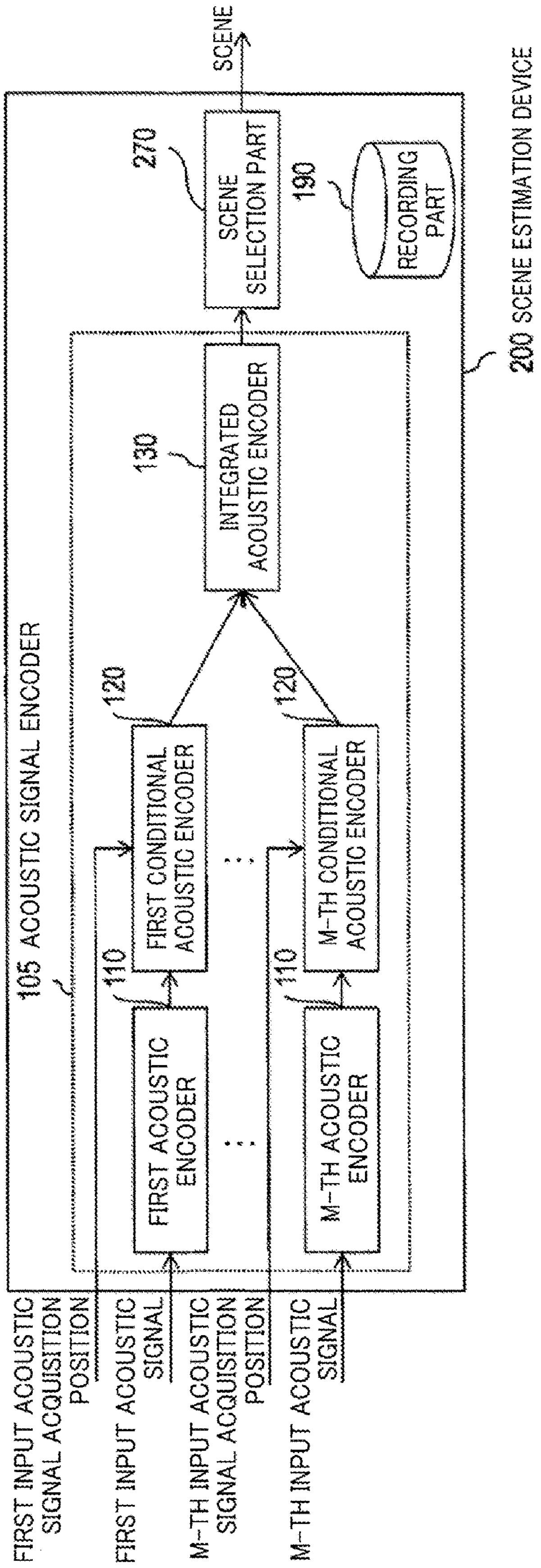
FIG. 3 is a block diagram illustrating an example of a configuration of a scene estimation device 200.
Figure 4:
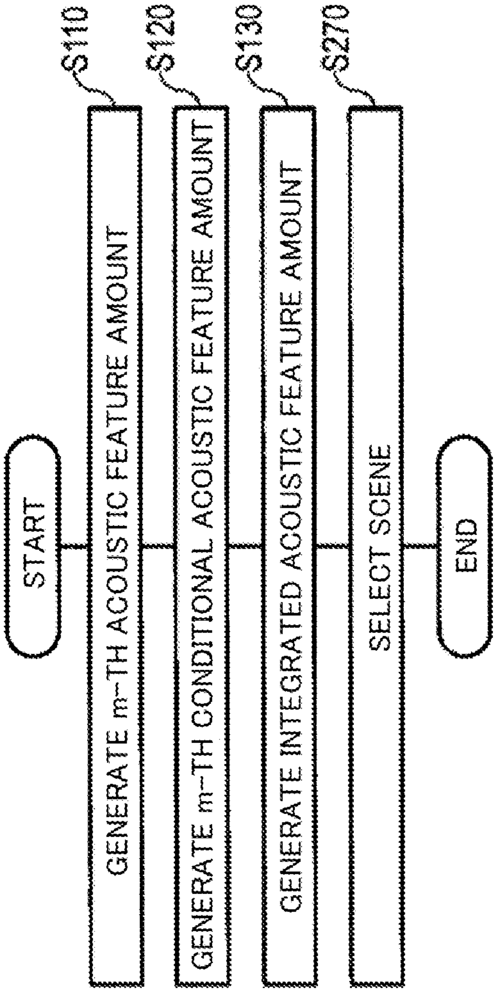
FIG. 4 is a flowchart illustrating an example of an operation of the scene estimation device 200.

The scene estimation device 200 will be described below with reference to FIGS. 3 and 4. FIG. 3 is a block diagram illustrating the configuration of the scene estimation device 200. FIG. 4 is a flowchart illustrating the operation of the scene estimation device 200. As illustrated in FIG. 3, the scene estimation device 200 includes M acoustic encoders 110 (hereinafter referred to as a first acoustic encoder 110, . . . , an M-th acoustic encoder 110), M conditional acoustic encoders 120 (hereinafter referred to as a first conditional acoustic encoder 120, . . . , an M-th conditional acoustic encoder 120), an integrated acoustic encoder 130, a scene selection part 270, and a recording part 190. The recording part 190 is a component that appropriately records information necessary for processing of the scene estimation device 200.

An operation of the scene estimation device 200 will be described with reference to FIG. 4. Since the processing from S110 to S130 is the same as that of the first embodiment, only the processing of S270 will be described here.

In S270, the scene selection part 270 receives the integrated acoustic feature amount generated in S130 as an input, and selects and outputs a scene from which M input acoustic signals are acquired from among S scenes using the integrated acoustic feature amount. For the configuration of the scene selection part 270, for example, a neural network composed of one linear layer and one Softmax layer can be used.

According to the embodiment of the present invention, it is possible to accurately estimate a scene even if the number of input signals increases. Specifically, by using the information on the position where the signal is acquired, a conditional feature amount having a smaller dimension can be generated, especially regarding the attention to be paid in the signal acquisition position, and by using the conditional feature amount, a scene can be accurately estimated.

Third Embodiment

Figure 5:
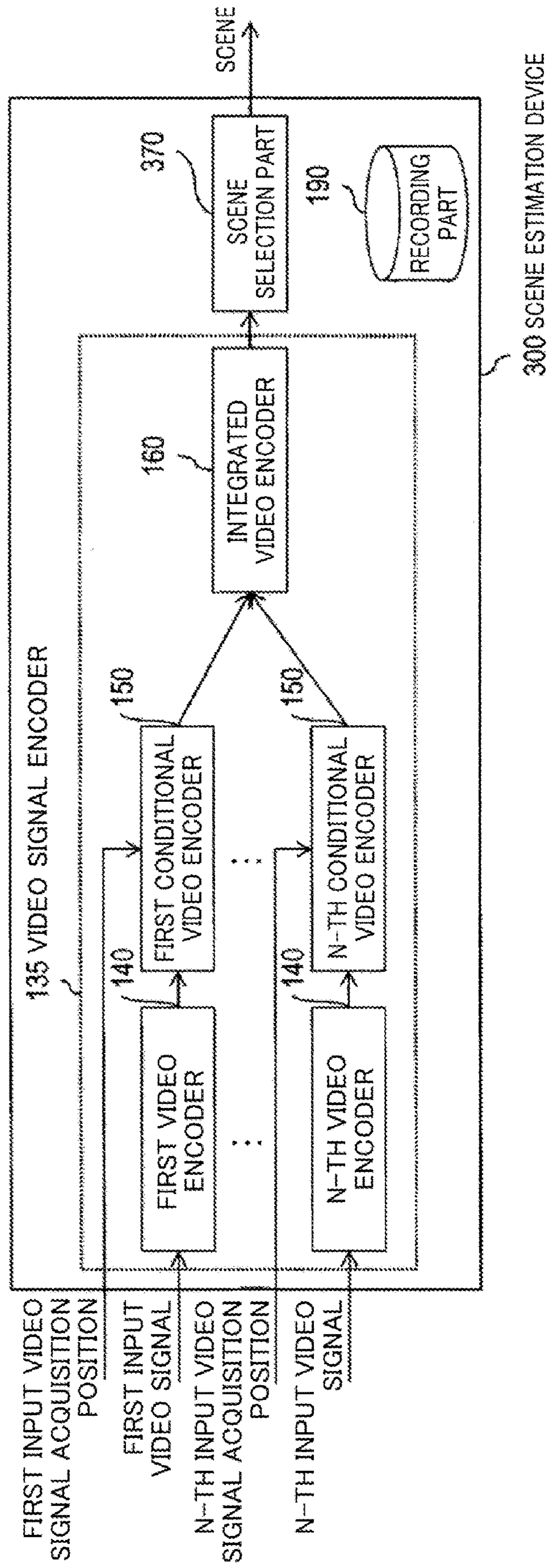
FIG. 5 is a block diagram illustrating an example of a configuration of a scene estimation device 300.

In the first embodiment, both the acoustic signal and the video signal are used as inputs, but only the video signal may be used. That is, a scene estimation device 300 receives N (where N is an integer of 1 or more) sets of an input video signal and a position where the input video signal is acquired as inputs, and selects and outputs a scene from which the input video signals are acquired from among S (where S is an integer of 1 or more) scenes. The scene estimation device 300 will be described below with reference to FIGS. 5 and 6. FIG. 5 is a block diagram illustrating the configuration of the scene estimation device 300.

Figure 6:
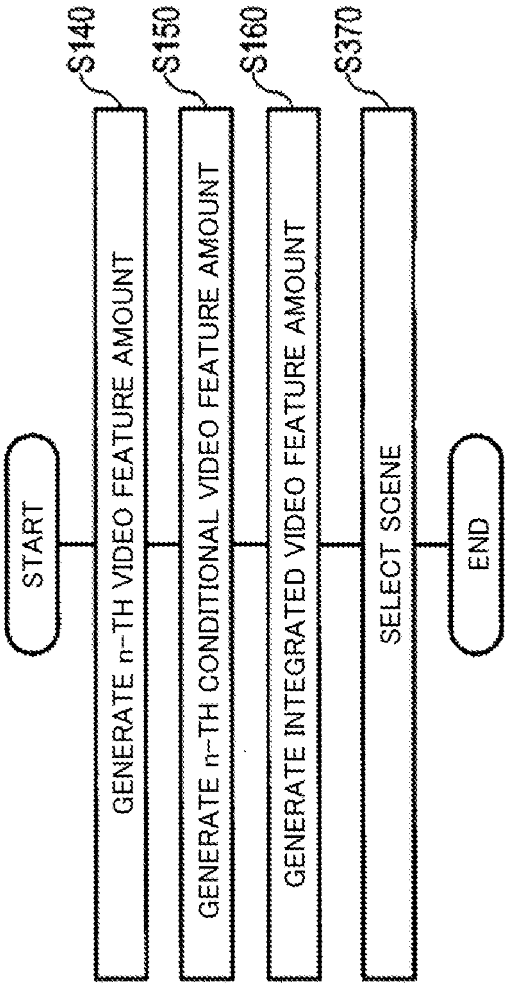
FIG. 6 is a flowchart illustrating an example of an operation of the scene estimation device 300.

FIG. 6 is a flowchart illustrating the operation of the scene estimation device 300. As illustrated in FIG. 5, the scene estimation device 300 includes N video encoders 140 (hereinafter referred to as a first video encoder 140, . . . , an N-th video encoder 140), N conditional video encoders 150

(hereinafter referred to as a first conditional video encoder 150, . . . , an N-th conditional video encoder 150), an integrated video encoder 160, a scene selection part 370, and a recording part 190. The recording part 190 is a component that appropriately records information necessary for processing of the scene estimation device 300.

An operation of the scene estimation device 300 will be described with reference to FIG. 6. Since the processing from S140 to S160 is the same as that of the first embodiment, only the processing of S370 will be described here.

In S370, the scene selection part 370 receives the integrated video feature amount generated in S160 as an input, and selects and outputs a scene from which N input video signals are acquired from among S scenes using the integrated video feature amount. For the configuration of the scene selection part 370, for example, a neural network composed of one linear layer and one Softmax layer can be used.

According to the embodiment of the present invention, it is possible to accurately estimate a scene even if the number of input signals increases. Specifically, by using the information on the position where the signal is acquired, a conditional feature amount having a smaller dimension can be generated, especially regarding the attention to be paid in the signal acquisition position, and by using the conditional feature amount, a scene can be accurately estimated.

<Supplement>

Figure 7:
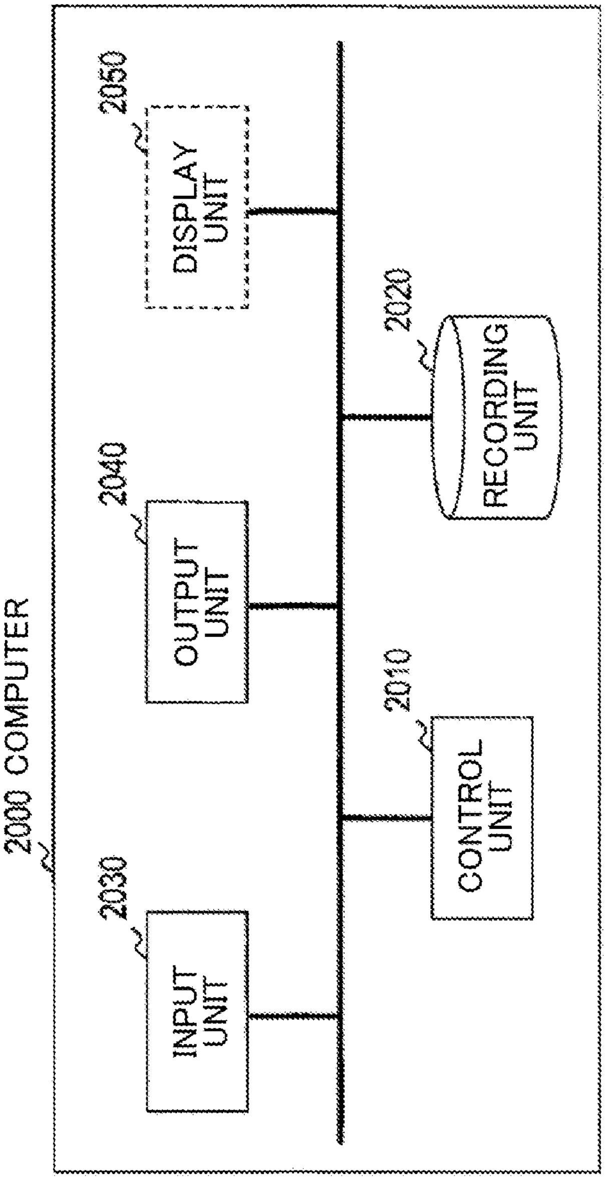
FIG. 7 is a diagram illustrating an example of a functional configuration of a computer that realizes each device according to an embodiment of the present invention.

FIG. 7 is a diagram illustrating an example of a functional configuration of a computer 2000 that realizes each of the above-described devices. The processing in each of the above-described devices can be performed by causing a recording unit 2020 to read a program for causing the computer 2000 to function as each of the above-described devices, and causing the program to be operated in a control unit 2010, an input unit 2030, an output unit 2040, and the like.

The device of the present invention includes, for example, as a single hardware entity, an input unit to which a keyboard or the like can be connected, an output unit to which a liquid crystal display or the like can be connected, a communication unit to which a communication device (for example, a communication cable) capable of communicating with the exterior of the hardware entity can be connected, a CPU (Central Processing Unit; which may also include a cache memory, registers, etc.), a RAM or ROM which is a memory, an external storage device which is a hard disk, and a bus that connects the input unit, the output unit, the communication unit, the CPU, the RAM, the ROM, and the external storage device such that data can be exchanged therebetween. As necessary, the hardware entity may be provided with a device (drive) capable of reading and writing a recording medium such as a CD-ROM. A general-purpose computer or the like is an example of a physical entity including such hardware resources.

The external storage device of the hardware entity stores a program that is needed to realize the above-mentioned functions and data needed for the processing of this program (not limited to the external storage device, and for example, the program may also be stored in a ROM, which is a read-only storage device). Also, the data and the like obtained through the processing of these programs is appropriately stored in a RAM, an external storage device, or the like.

In the hardware entity, each program stored in the external storage device (or the ROM, etc.) and the data needed for processing of each program are loaded to the memory as needed, and the CPU interprets, executes, and processes them as appropriate. As a result, the CPU realizes a predetermined function (each component represented by the above, . . . part, . . . means, etc.).

The present invention is not limited to the embodiments described above, and can be modified appropriately within a scope not departing from the gist of the present invention. Further, the processes described in the embodiments are not only executed in time series in the described order, but also may be executed in parallel or individually according to a processing capability of a device that executes the processes or as necessary.

As described above, when the processing function in the hardware entity (device of the present invention) described in the above-described embodiments is realized by a computer, the processing contents of the function to be included in the hardware entity are described by a program. By executing this program on the computer, the processing function in the above-described hardware entity is realized on the computer.

The program describing the processing contents can be recorded in a computer-readable recording medium. Any computer-readable recording medium may be used, such as a magnetic recording device, an optical disc, a magneto-optical recording medium, or a semiconductor memory. Specifically, for example, a hard disk device, a flexible disk, a magnetic tape, or the like can be used as the magnetic recording device, a DVD (Digital Versatile Disc), a DVD-RAM (Random Access Memory), a CD-ROM (Compact Disc Read Only Memory), a CD-R (Recordable)/RW (Re-Writable), or the like can be used as the optical disc, an MO (Magneto-Optical disc) or the like can be used as the magneto-optical recording medium, and an EEP-ROM (Electronically Erasable and Programmable-Read Only Memory) or the like can be used as the semiconductor memory.

In addition, the distribution of this program is carried out by, for example, selling, transferring, or lending a portable recording medium such as a DVD or a CD-ROM on which the program is recorded. Further, the program may be distributed by storing the program in a storage device of a server computer and transferring the program from the server computer to other computers via a network.

A computer executing such a program first stores, for example, a program recorded on a portable recording medium or a program transferred from a server computer in its own storage device. When executing the processing, the computer reads the program stored in its own storage device, and executes the processing according to the read program. As another execution form of the program, the computer may directly read a program from a portable recording medium and execute processing according to the program, each time a program is transferred from the server computer to the computer, processing according to the received program may be executed sequentially. In addition, by a so-called ASP (Application Server Provider) type service which does not transfer a program from the server computer to the computer and realizes a processing function only by the execution instruction and the result acquisition, the above-mentioned processing may be executed. It is assumed that the program in this form includes information to be used for processing by a computer and conforming to the program (data that is not a direct command to the computer but has the property of defining the processing of the computer, etc.).

In this form, the hardware entity is configured by executing a predetermined program on a computer, but at least part of the processing contents may be realized by hardware.

The above description of the embodiments of the present invention is presented for the purpose of illustration and description. There is no intention to be exhaustive and there is no intention to limit the invention to a disclosed exact form. Modifications or variations are possible from the above-described teachings.

The embodiments are selectively represented in order to provide the best illustration of the principle of the present invention and in order for those skilled in the art to be able to use the present invention in various embodiments and with various modifications so that the present invention is suitable for deliberated practical use. All of such modifications or variations are within the scope of the present invention defined by the appended claims interpreted according to a width given fairly, legally and impartially.

The invention claimed is:

1. A scene selection method comprising:

when S is a number of scenes and M is a number of input acoustic signals, an acoustic signal encoding step of generating, by a scene selection device, an integrated acoustic feature amount from an m-th input acoustic signal (m=1, . . . , M) and a position where the m-th input acoustic signal is acquired (hereinafter referred to as an m-th input acoustic signal acquisition position) (m=1, . . . , M), wherein the generating the integrated acoustic feature amount further comprises: p2 an m-th acoustic encoding step (m=1, . . . , M) of generating an m-th acoustic feature amount from the m-th input acoustic signal, an m-th conditional acoustic encoding step (m=1, . . . , M) of generating an m-th conditional acoustic feature amount from the m-th acoustic feature amount and the m-th input acoustic signal acquisition position, a dimension of the m-th conditional acoustic feature amount being smaller than a dimension of the m-th acoustic feature amount, thereby removing a feature that is redundant according to a position of acquiring the m-th input acoustic signal, and an integrated acoustic encoding step of generating the integrated acoustic feature amount from the m-th conditional acoustic feature amount (m=1, . . . , M); and a scene selection step of selecting, by the scene selection device, a scene from which M input acoustic signals are acquired from among S scenes, using the integrated acoustic feature amount, wherein the m-th acoustic encoding step (m=1, . . . , M) is performed by a multi-layer Convolutional Neural Network (CNN) and the input to the multi-layer CNN is a logarithmic mel spectrogram obtained by applying a short-time Fourier transform (STFT) to the m-th input acoustic signal and by further applying a mel filter bank, the m-th conditional acoustic encoding step (m=1, . . . , M) is performed by a first neural network comprising a linear layer and the input to the first neural network is a first vector obtained by combining the m-th acoustic feature amount and the m-th input acoustic signal acquisition position, the integrated acoustic encoding step is performed by a second neural network comprising a linear layer and the input to the second neural network is a second vector obtained by combining the m-th conditional acoustic feature amount (m=1, . . . , M), and the scene selection step is performed by a third neural network comprising a linear layer and a Softmax layer.

2. A scene selection method comprising:

when S is a number of scenes, M is a number of input acoustic signals, and N is a number of input video signals, an acoustic signal encoding step of generating, by a scene selection device, an integrated acoustic feature amount from an m-th input acoustic signal (m=1, . . . , M) and a position where the m-th input acoustic signal is acquired (hereinafter referred to as an m-th input acoustic signal acquisition position) (m=1, . . . , M), wherein the generating the integrated acoustic feature amount further comprises:

an m-th acoustic encoding step (m=1, . . . , M) of generating an m-th acoustic feature amount from the m-th input acoustic signal;

an m-th conditional acoustic encoding step (m=1, . . . , M) of generating an m-th conditional acoustic feature amount from the m-th acoustic feature amount and the m-th input acoustic signal acquisition position, a dimension of the m-th conditional acoustic feature amount being smaller than a dimension of the m-th acoustic feature amount, thereby removing a feature that is redundant according to a position of acquiring the m-th input acoustic signal; and an integrated acoustic encoding step of generating the integrated acoustic feature amount from them-th conditional acoustic feature amount (m=1, . . . , M);

a video signal encoding step of generating, by the scene selection device, an integrated video feature amount from an n-th input video signal (n=1, . . . , N) and a position where the n-th input video signal is acquired (hereinafter referred to as an n-th input video signal acquisition position) (n=1, . . . , N)

wherein the generating the integrated video feature amount further comprises:

an n-th video encoding step (n=1, . . . , N) of generating an n-th video feature amount from then-th input video signal;

an n-th conditional video encoding step (n=1, . . . , N) of generating an n-th conditional video feature amount from the n-th video feature amount and the n-th input video signal acquisition position, a dimension of the n-th conditional video feature amount being smaller than a dimension of the n-th video feature amount, thereby removing a feature that is redundant according to a position of acquiring the n-th input video signal; and an integrated video encoding step of generating the integrated video feature amount from the n-th conditional video feature amount (n=1, . . . , N); and a scene selection step of selecting, by the scene selection device, a scene from which M input acoustic signals and N input video signals are acquired from among S scenes, using the integrated acoustic feature amount and the integrated video feature amount, wherein the m-th acoustic encoding step (m=1, . . . , M) is performed by a multi-layer Convolutional Neural Network (CNN) and the input to the multi-layer CNN is a logarithmic mel spectrogram obtained by applying a short-time Fourier transform (STFT) to the m-th input acoustic signal and by further applying a mel filter bank, the m-th conditional acoustic encoding step (m=1, . . . , M) is performed by a first neural network comprising a linear layer and the input to the first neural network is a first vector obtained by combining the m-th acoustic feature amount and the m-th input acoustic signal acquisition position, the integrated acoustic encoding step is performed by a second neural network comprising a linear layer and the input to the second neural network is a second vector obtained by combining the m-th conditional acoustic feature amount (m=1, . . . , M), the n-th video encoding step (n=1, . . . , N) is performed by ResNet, the n-th conditional video encoding step (n=1, . . . , N) is performed by a third neural network comprising a linear layer and the input to the third neural network is a third vector obtained by combining the n-th video feature amount and the n-th input video signal acquisition position, the integrated video encoding step is performed by a fourth neural network comprising a linear layer and the input to the fourth neural network is a fourth vector obtained by combining the n-th conditional video feature amount (n=1, . . . , N), and the scene selection step is performed by a fifth neural network comprising a linear layer and a Softmax layer and the input to the fifth neural network is a fifth vector obtained by combining the integrated acoustic feature amount and the integrated video feature amount.

3. A scene selection device comprising:

when S is a number of scenes and M is a number of input acoustic signals, an acoustic signal encoding circuitry configured to generate an integrated acoustic feature amount from an m-th input acoustic signal (m=1, . . . , M) and a position where the m-th input acoustic signal is acquired (hereinafter referred to as an m-th input acoustic signal acquisition position) (m=1, . . . , M), wherein the acoustic signal encoding circuitry further comprises:

an m-th acoustic encoding circuitry (m=1, . . . , M) configured to generate an m-th acoustic feature amount from the m-th input acoustic signal, an m-th conditional acoustic encoding circuitry (m=1, . . . , M) configured to generate an m-th conditional acoustic feature amount from the m-th acoustic feature amount and the m-th input acoustic signal acquisition position, a dimension of the m-th conditional acoustic feature amount being smaller than a dimension of the m-th acoustic feature amount, thereby removing a feature that is redundant according to a position of acquiring the m-th input acoustic signal, and an integrated acoustic encoding circuitry configured to generate the integrated acoustic feature amount from the m-th conditional acoustic feature amount (m=1, . . . , M); and a scene selection circuitry configured to select a scene from which M input acoustic signals are acquired from among S scenes, using the integrated acoustic feature amount, wherein the m-th acoustic encoding circuitry (m=1, . . . , M) is configured using a multi-layer Convolutional Neural Network (CNN) and the input to the multi-layer CNN is a logarithmic mel spectrogram obtained by applying a short-time Fourier transform (STFT) to the m-th input acoustic signal and by further applying a mel filter bank, the m-th conditional acoustic encoding circuitry (m=1, . . . , M) is configured using a first neural network comprising a linear layer and the input to the first neural network is a first vector obtained by combining the m-th acoustic feature amount and the m-th input acoustic signal acquisition position, the integrated acoustic encoding circuitry is configured using a second neural network comprising a linear layer and the input to the second neural network is a second vector obtained by combining the m-th conditional acoustic feature amount (m=1, . . . , M), and the scene selection circuitry is configured using a third neural network comprising a linear layer and a Softmax layer.

4. A non-transitory computer-readable recording medium recording a program for causing a computer to execute the scene selection method according to claim 1.

5. A non-transitory computer-readable recording medium recording a program for causing a computer to execute the scene selection method according to claim 2.

* * * * *